United States
Hosokawa

[11] 3,863,247
[45] Jan. 28, 1975

[54] DRIVING CIRCUIT FOR LIQUID CRYSTAL DISPLAY CELL

[75] Inventor: Minoru Hosokawa, Suwa, Japan

[73] Assignee: Kabushiki Kaisha Suwa Seikosha, Tokyo, Japan

[22] Filed: Oct. 18, 1972

[21] Appl. No.: 298,681

[30] Foreign Application Priority Data
Oct. 18, 1971 Japan.......................... 46-82243

[52] U.S. Cl............................ 340/336, 350/160 LC
[51] Int. Cl............................. G02f 1/18, G09f 9/32
[58] Field of Search.......... 340/336, 324 R, 324 M; 350/160 LC; 315/169 R, 169 TV

[56] References Cited
UNITED STATES PATENTS

| | | | |
|---|---|---|---|
| 3,653,745 | 4/1972 | Mao.............................. | 350/160 LC |
| 3,654,606 | 4/1972 | Marlowe et al............... | 350/160 LC |

*Primary Examiner*—John W. Caldwell
*Assistant Examiner*—Marshall M. Curtis
*Attorney, Agent, or Firm*—Blum, Moscovitz, Friedman & Kaplan

[57] ABSTRACT

A driving circuit for a multi-column liquid crystal display cell wherein a data signal is transformed into a data signal alternating in a uniform period. A decoder matrix circuit has said transformed data signal as one group of inputs and a timing signal representative of each column as a second group of inputs. The liquid crystal display cell is driven by an alternating output signal from said decoder matrix circuit and an alternating output signal applied to an electrode of said liquid crystal display cell common to all of the columns thereof.

5 Claims, 7 Drawing Figures

3,863,247

DRIVING CIRCUIT FOR LIQUID CRYSTAL DISPLAY CELL

BACKGROUND OF THE INVENTION

This invention relates to circuits for driving a liquid crystal display cell by means of alternating current. Such liquid crystal display cells may be formed from nematic-type liquid crystal material and may be utilized to display figures, letters, symbols and the like in a portable small-size calculator, meter or the like. In such uses, the liquid crystal cell is provided with a plurality of columns.

Nematic-type liquid crystal material demonstrates a light-scattering effect upon the application of several to volts to several multiples of ten volts, while consuming very small amounts of electric power. Applying direct current voltage to a liquid crystal reduces the life of the crystal and the resolution thereof due to the staining of the electrodes, the change in quality of the liquid crystal material, the generation of bubbles within the liquid crystal material, as well as the mutual action between the current flowing in only a single direction and impurities within the liquid crystal material. In some liquid crystal cells, this phenomenon occurs after only several multiples of ten hours after applying the D.C. voltage. On the other hand, when an A.C. voltage is applied to a liquid crystal cell, such as a sine wave, a rectangular wave, or the like, the current flowing through the liquid crystal is an alternating current and the adverse effects of bubble generation and resolution of molecules is avoided. Upon the application of A.C. voltages, the life of a liquid crystal cell can be expected to be more than multiples of 10,000 hours, bringing the life of liquid crystal cells within the range of the competitive cold cathode gas discharge tubes, flourescent display tubes, light-emitting diodes and the like. However, the prior art approaches for applying liquid crystal display cells to calculators, measuring equipment and the like has resulted in complex circuitry, by the arrangement in accordance with the invention, such driving circuitry is materially simplified.

SUMMARY OF THE INVENTION

Generally speaking, in accordance with the invention, a driving circuit for a liquid crystal display cell is provided including transforming circuit means for transforming a data signal into a data signal alternating in a uniform period; decoder matrix circuit means for storing an alternating output signal in response to a first group of inputs represented by said transformed alternating data signal and a second set of inputs representing timing signals associated with each column of said liquid crystal display cell; and means for applying said alternating output signals from said decoder matrix means to a segmented electrode of said liquid crystal display cell and a synchronized alternating signal applied to an electrode common to all of the columns of said display cell.

Accordingly, the object of this invention is to provide a simplified circuit for applying an alternating driving signal to a liquid crystal display cell for the purpose of extending the life thereof.

Still other objects and advantages of the invention will in part be obvious and will in part be apparent from the specification and drawings.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
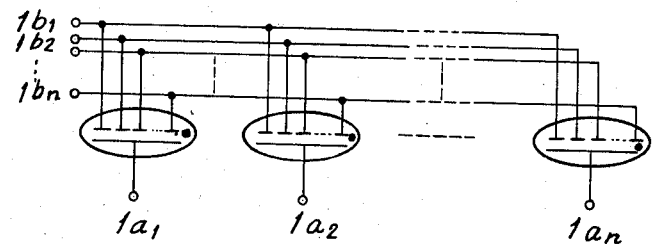
FIG. 1 is a circuit diagram showing the method of driving a conventional display tube.

Referring now to FIG. 1, the connecting circuit for a conventional display tube is depicted. The anodes $1a_1$, $1a_2$, . . . , $1a_n$, of each column are driven by timing pulses associated with that respective column. The cathode side of the electrode is divided into segments and the corresponding segments of each column are connected together, the groups of corresponding segments being connected in parallel to terminals $1b_1$, $1b_2$, . . . , $1b_n$. A data signal wherein the signal of all columns are modulated by time division is applied to each of the parallel segments $1b_1$, $1b_2$, . . . $1b_n$. The display tube of FIG. 1 is actuated dynamically by repeatedly applying a current through each display cell only when the column timing pulses applied to the anodes are synchronized with the data signals applied to the respective segments of the cathodes.

In the case of thermionic cathode flourescent display tubes, a low voltage static driving method is utilized wherein each display segment has a memory circuit such as the memory circuit described below in connection with FIG. 3. As used herein, "memory circuit" is used interchangeably with "decoder circuit" for the circuit directing the input data signals to the desired display segments. This method could be applied to liquid crystal display cells if such cells could endure driving by direct current, but such cells require an alternating driving signal, rendering this driving approach unsuitable.

Figure 2:
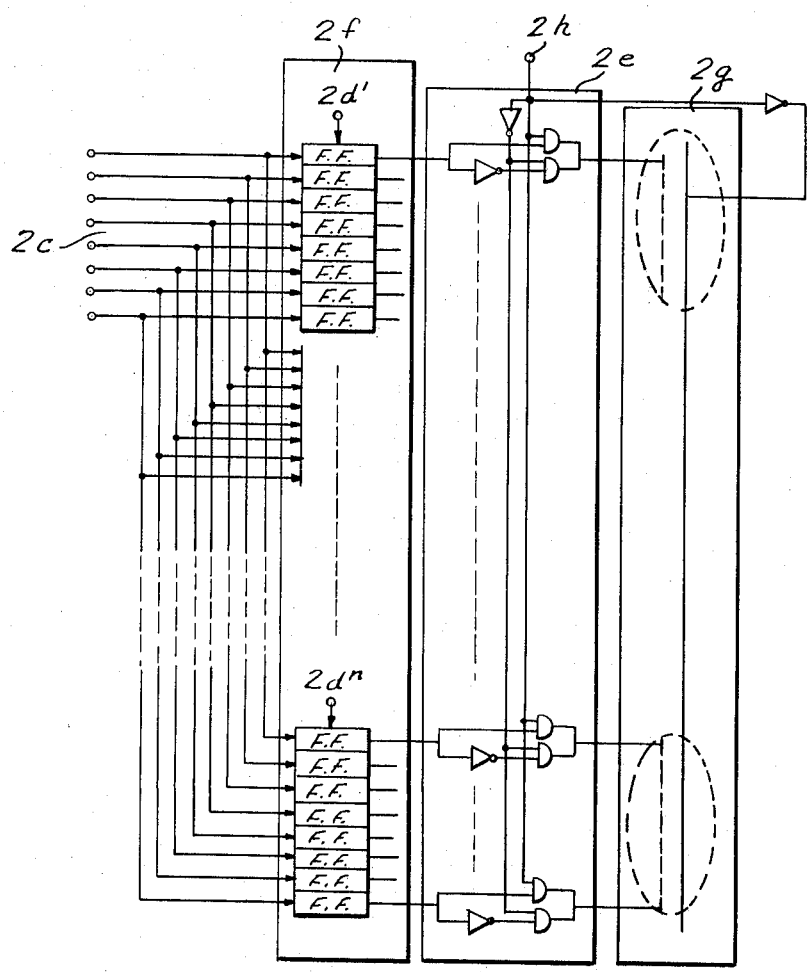
FIG. 2 is a circuit diagram illustrating the conventional driving circuit for a liquid crystal display cell.

In a liquid crystal cell, the response speed is slow and the applied voltage required to obtain sufficient lighting is high compared with the threshold voltage. In the art, the lighting of liquid crystal display cells has been achieved by providing each segment of each column with an alternating driving circuit. A circuit block diagram for this purpose is illustrated in FIG. 2, wherein a data input signal $2c$ is applied from a computing circuit to a signal transforming circuit $2e$, which in turn is connected to a liquid crystal display cell $2g$. Timing pulses $2d^1, 2d^2, \ldots, 2d^n$, respectively assoicated with each column of of the display cell are applied to the flip-flop circuits associated with each column forming said memory circuit $2f$. The column timing pulses serve to store within each flip-flop the data signals to be displayed in each segment of the liquid crystal cell. In transforming circuit $2e$, the signal corresponding to each segment of each column stored in the respective flip-flop circuit of memory $2f$ is transformed into an alternating data signal by the alternating signal $2h$ for driving. Said alternating signal $2h$ is also applied to the common electrode of the display cell.

Said common electrode is formed as a single electrode by collecting all of the electrodes opposite each segment of all of the columns. The alternating signal $2h$ is applied to said common electrode. The data associated with each segment of each of the columns stored in the respective flip-flop circuit is transformed into an alternating data signal by means of the signal transforming circuit $2e$. The alternating data signal associated with each segment to be lighted has the same period as the alternating signal applied to the common electrode and has an inverse polarity. The alternating data signal of segments which are not to be lighted has the same polarity as the signal on the common electrode. This approach permits the inversion of the electric field between the first half and the second half of each period of the alternating driving signal so that alternating current flows in the portion of the liquid crystal material to be lighted or rendered visible. No current flows in portions of the liquid crystal material which are not to be lighted or are not to be rendered visible since the electric potential on the corresponding segment electrodes is always equal to the potential on the common electrode.

The circuit of FIG. 2 is suitable for use as a driving circuit of a device having a data output circuit at each column. However, in the calculator of FIG. 2, th successive data output signals $2c$ are transformed into the parallel output signal by providing each segment of each column with a flip-flop circuit, and a gate for alternating the output signal of every flip-flop circuit is provided. Thus, the circuit of FIG. 2 requires one flip-flop for each segment of each column in the calculator, as well as corresponding circuitry in the transforming circuit $2e$. The alternating signal $2h$ is normally a rectangular wave whose duty ratio is 1:2 and whose frequency is normally a multiple of ten Hz to several hundreds Hz. The foregoing circuit is relatively complicated, while in low-priced and small-sized portable calculators or measuring equipment, it is both necessary and desirable to simplify the driving circuit.

Figure 3:
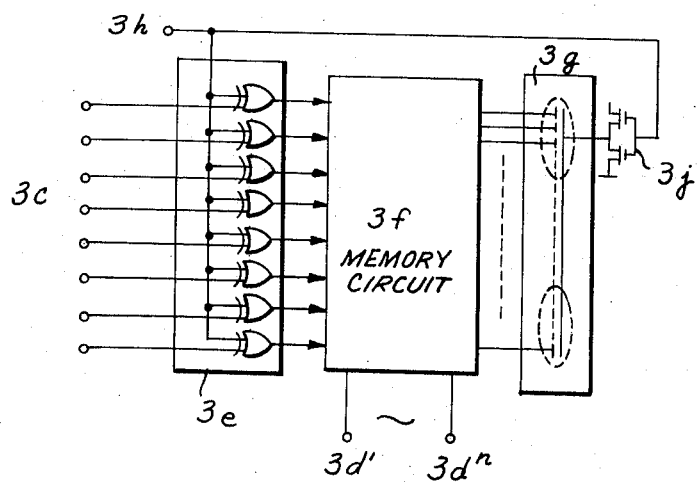
FIG. 3 is a circuit diagram showing the driving circuit for liquid crystal display cells in accordance with the invention.
Figure 5:
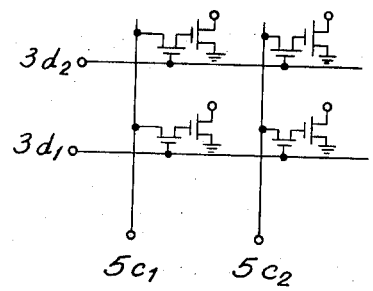
FIG. 5 shows a circuit diagram of a portion of a memory circuit suitable for incorporation in FIG. 3.

The circuit diagram of the arrangement in accordance with the invention is depicted in FIG. 3 wherein a data input signal $3c$ and timing signals $3d^1, 3d^2, \ldots, 3d^n$ are provided, each of said timing signals being associated with one of the columns of the liquid crystal display cell $3g$. The data input signal is transformed into an alternating data signal by an alternating signal $3h$ by means of transforming circuit $3e$. Alternating signal $3h$ has a period $T_2$. Memory circuit $3f$ is provided for receiving the alternating data signal output of transforming circuit $3e$, as well as timing signals $3d^1, 3d^2, \ldots, 3d^n$. A portion of memory circuit $3f$ is illustrated in FIG. 5 and is seen to be a matrix arrangement having a storage device consisting of two MOSFET transistors at each intersection of one of the group of alternating data input signals and one of the group of column timing signals. Each of the pairs of transistors represents one segment of one column, the overall memory circuit having a simple construction. Signals $5c_1, 5c_2$, etc. represent the output signals from transforming circuit $3e$.

Figure 4:
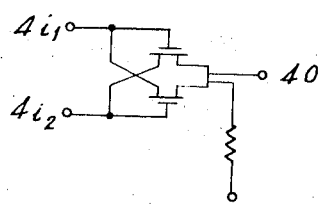
FIG. 4 shows a circuit diagram of an exclusive-OR logic circuit such as may be incorporated in the transformer circuit of FIG. 3.

As shown in FIGS. 3 and 4, the transforming circuit $3e$ consists of a group of exclusive-OR logic circuits which may be defined by a pair of transistors. In the embodiment illustrated in FIG. 4, P-type MOSFET's are used to produce output $4o$ from inputs $4i_1$ and $4i_2$.

The circuit in accordance with the invention as illustrated in FIG. 3 requires only one transforming circuit element for each segment of a single column regardless of the number of columns or the number of stages to be displayed. In other words, if the arrangement is adapted to display ten digits of numbers or ten columns, but each column requires only eight segments (as in the case of an eight-bar display), then only eight exclusive-OR logic circuits must be incorporated in transforming circuit $3e$. It is noted that the arrangement in accordance with the invention is not limited to numerical displays, and would also be applicable to displays of letters and symbols.

A further reduction in the number of elements required is achieved by the substitution of the simple matrix arrangement of FIG. 5 for the prior art flip-flop circuits within memory circuit $3f$. In the memory circuit, the capacitance in the gate electrode of the transistor on the output signal side of the memory device is utilized. The data signals $5c_1, 5c_2$, etc. have a frequency of several hundreds Hz to several KHz in normal small-sized table calculators, so that the memory circuit depicted in FIG. 5 is sufficient. It is preferred that the output stage transistor for driving each segment and for driving the common electrode take the form of a complementary-type circuit as represented by circuit $3j$ of FIG. 3. However, since the resistance of each segment of the liquid crystal display cell is extremely high, some reaching to several hundreds Mohms, it is suffficient to insert a sufficiently small resistance for the resistance value of each segment in place of a transistor on one side. The resistance value of the side of the common electrode is taken to be sufficiently smaller than the resistance value where all of the segments are in parallel.

Figure 6:
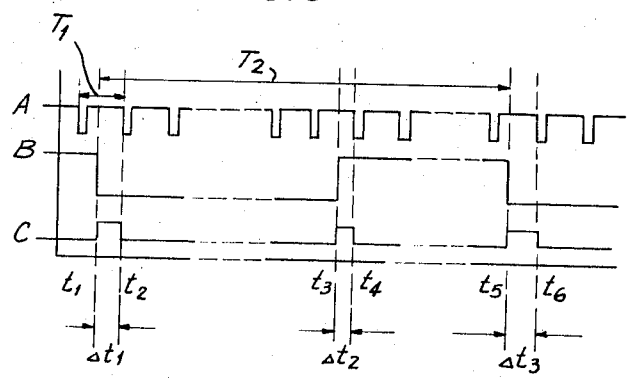
FIG. 6 shows wave form diagrams of the circuit of FIG. 3.

The period $T_2$ of alternating signal $3h$ must be selected so that $T_3 > T_1$, where $T_1$ is the circulating period of the data output signal. Normally, it is desirable to take $T_2$ as being several times as large as $T_1$. Referring to the waveform diagrams of FIG. 6, waveform A represents the timing pulse associated with one column, waveform B depicts the rectangular alternating signal for driving the display cell while waveform C shows the lag of the timing pulse A relative to the inverse point of the waveform B. The input signals $3d_1, 3d_2, \ldots, 3d_n$ applied to memory circuit $3f$ are inverted at the time $t_1$ but the output signals from the memory circuit are inverted at the time $t_2$ by the timing pulse A. Accordingly, between the inversion $t_1$ of the electric potential on one side of the common electrode and the inversion $t_2$ of the electric potential of each segment (the output signal from the memory circuit) the time difference $\Delta t_1$ occurs as follows:

$$\Delta t_1 = t_2 - t_1 \ (\Delta t_n = t_{2n} - t_{2n-1}) < T_1$$

Figure 7:
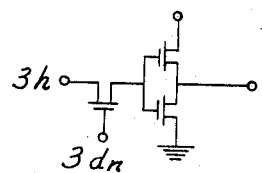
FIG. 7 is a circuit diagram of the driving circuit of a column of the liquid crystal display cell of FIG. 3 provided with a gate for receiving a timing impulse.

This condition inevitably results where the periods of the signals of A and B are not synchronized. If the above-described $\Delta t_n$ is selected to be smaller than $T_2/2$, the problem of the time difference $\Delta t$ does not occur because of the lag of response of said display cell is large and because the frequency of B is selected to be larger than the frequency to which the eye can respond. Normally, it is extremely simple to select waveform A so as to have a frequency of several hundreds Hz and B so that it has a frequency of several tens Hz.

Where it is necessary to select the frequency of the data signal at a value less than several hundreds Hz, or to select the frequency of the driving signal B near the frequency of the timing signal, $\Delta t$ may be about $T_2/2$. In this case, $\Delta t$ would be made equal to zero by synchronizing the periods $T_1$ and $T_2$. Where a synchronizing circuit is not provided, the signal applied to each segment electrode of the liquid crystal cell can be easily synchronized with the signal applied to the common electrode by providing each column of said common electrode of the display cell with a single transistor, as shown in FIG. 7, for controlling the gate according to the timing pulse signal $3d_n$ of that column.

The driving circuit for liquid crystal display cells in accordance with the invention minimizes the number of components required since the number of elements required for the transforming circuit is independent of the number of columns. The total number of circuits required is small even as compared with the case of driving a liquid crystal display by direct current. Further, the period $T_2$ of the alternating signal for driving can be selected so that it falls within limits larger than $T_1$, so that it is unnecessary to synchronize these signals.

It will thus be seen that the objects set forth above, and those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A driving circuit for a liquid crystal display cell having a segmented electrode divided into a plurality of segments grouped in a plurality of columns and a common electrode, comprising transforming circuit means for transforming input data signals into data signals alternating with a uniform period in response to an alternating driving signal, the data portions of said data signal alternating out of phase with said alternating driving signal; memory circuit means having a memory decoder matrix means having first and second groups of inputs, said first group of inputs being connected to said transforming circuit means for receiving said alternating data signals from said transforming circuit means, said second group of inputs being connected to receive timing signals representative respectively of each of said plurality of columns, said decoder matrix means having a plurality of outputs each connected with one of said liquid crystal display cell segmented electrode segments for applying an alternating output signal to selected ones of said segments; and means for applying said alternating driving signal to said common electrode.

2. A driving circuit as recited in claim 1, wherein said data signal has a period $T_1$ and said alternating driving signal has a period $T_2$ selected so that $T_2 > T_1$.

3. A driving circuit as recited in claim 1, including means for synchronizing the alternating output signals applied to the segmented electrode segments with the alternating driving signal applied to the common electrode including gate circuit means associated with each of said columns for receiving said alternating driving signal and the associated column timing signal, said common electrode being divided into separate common electrodes for each column for connection to respective ones of said gate circuit means.

4. A driving circuit as recited in claim 1, wherein said transforming circuit means includes one exclusive OR logic circuit for each segment in a single column of said liquid crystal display cell, each of said exclusive OR logic circuits having as its inputs said alternating driving signal and one of said input data signals.

5. A driving circuit as recited in claim 1, wherein said decoder matrix means is formed from MOSFET's.

* * * * *